US011352210B1

(12) United States Patent
Smith

(10) Patent No.: US 11,352,210 B1
(45) Date of Patent: Jun. 7, 2022

(54) METHODS OF MOVING TIRES TOWARD OR AWAY FROM VEHICLES USING TIRE DOLLY ASSEMBLIES

(71) Applicant: Charles Smith, Houston, TX (US)

(72) Inventor: Charles Smith, Houston, TX (US)

( * ) Notice: Subject to any disclaimer, the term of this patent is extended or adjusted under 35 U.S.C. 154(b) by 0 days.

(21) Appl. No.: 16/683,036

(22) Filed: Nov. 13, 2019

(51) Int. Cl.
*B65G 7/04* (2006.01)

(52) U.S. Cl.
CPC ........ *B65G 7/04* (2013.01); *B65G 2201/0273* (2013.01)

(58) Field of Classification Search
CPC ... B65G 7/02; B65G 7/04; B65G 7/08; B65G 2201/0273; B60B 29/002; B60B 29/001; B62B 1/008; B62B 1/10; B62B 1/02; B62B 1/12; B62B 1/26; B62B 5/067; B62B 2202/031; B62B 2203/05; B60S 13/00; B64F 1/22; B64F 1/227; B60P 3/125
USPC ................... 414/428, 430; 280/47.24, 47.12; 254/8 R, 131, 8 C, 8 B, 15, 17, 5 R, 5 B, 254/5 C, 3 R, 3 B, 3 C, 120, 131.5
See application file for complete search history.

(56) References Cited

U.S. PATENT DOCUMENTS

| 167,776 | A | * | 9/1875 | Minor | B62B 5/0083 280/62 |
| 2,135,802 | A | | 11/1938 | Dinkins | |
| 2,207,443 | A | | 7/1940 | Schneider | |
| 2,345,458 | A | * | 3/1944 | Caron | B60B 29/002 414/428 |
| 2,514,781 | A | * | 7/1950 | Miller | B60B 29/002 414/427 |
| 2,597,765 | A | | 5/1952 | Welburn | |
| 2,640,615 | A | | 6/1953 | Weldel | |
| 2,655,341 | A | * | 10/1953 | Clark | B60B 29/001 254/131 |
| 2,692,694 | A | | 11/1954 | Goldstein | |
| 2,877,912 | A | | 3/1959 | Di Giacomo | |
| 3,735,882 | A | * | 5/1973 | Reznicek | B60B 29/002 414/428 |
| 3,828,955 | A | * | 8/1974 | Harkey | B60B 29/002 414/428 |
| 4,690,605 | A | * | 9/1987 | Coccaro | B60B 29/002 254/119 |
| 4,872,694 | A | | 10/1989 | Griesinger | |
| 5,248,235 | A | * | 9/1993 | Poten | B66F 7/246 414/430 |

(Continued)

FOREIGN PATENT DOCUMENTS

| GB | 1161566 A | 8/1969 |
| GB | 2261424 A | 5/1993 |

(Continued)

*Primary Examiner* — Glenn F Myers
(74) *Attorney, Agent, or Firm* — Elliott Law PLLC; Douglas H. Elliott; Nathan Q. Huynh

(57) ABSTRACT

Described herein includes methods of removing or installing a tire on a vehicle, each method may include: positioning a portion of the tire dolly assembly beneath the tire, and either moving the tire away from or toward the vehicle using the tire dolly assembly that may include: (a) a base having an upper surface and lower surface, and (b) a protrusion coupled to the base and having a curved surface at least a portion of which extends below the lower surface when the tire dolly assembly is positioned beneath the tire.

20 Claims, 8 Drawing Sheets

(56) References Cited

U.S. PATENT DOCUMENTS

| | | | | |
|---|---|---|---|---|
| 5,249,907 | A | * 10/1993 | Poten | B66F 7/246 |
| | | | | 280/43.11 |
| 5,356,163 | A | 10/1994 | Suggs, Sr. | |
| 5,433,469 | A | * 7/1995 | Cassels | B62B 1/264 |
| | | | | 280/47.27 |
| 6,079,941 | A | * 6/2000 | Lee | B62B 3/04 |
| | | | | 16/35 R |
| 6,149,168 | A | * 11/2000 | Pauser | B25H 3/00 |
| | | | | 280/43.1 |
| 6,332,620 | B1 | 12/2001 | Mosher et al. | |
| 7,431,314 | B2 | 11/2008 | Donaldson | |
| 2010/0092270 | A1 | * 4/2010 | Adams | B60B 29/002 |
| | | | | 414/427 |
| 2015/0048287 | A1 | * 2/2015 | Chernyshou | B66F 15/00 |
| | | | | 254/129 |
| 2017/0096156 | A1 | * 4/2017 | McAleenan | B62B 1/12 |
| 2018/0201290 | A1 | * 7/2018 | Guerdrum | B62B 3/12 |

FOREIGN PATENT DOCUMENTS

| | | |
|---|---|---|
| WO | WO1990007432 A1 | 7/1990 |
| WO | WO1991006437 A1 | 6/1991 |
| WO | WO2005123419 A1 | 12/2005 |

\* cited by examiner

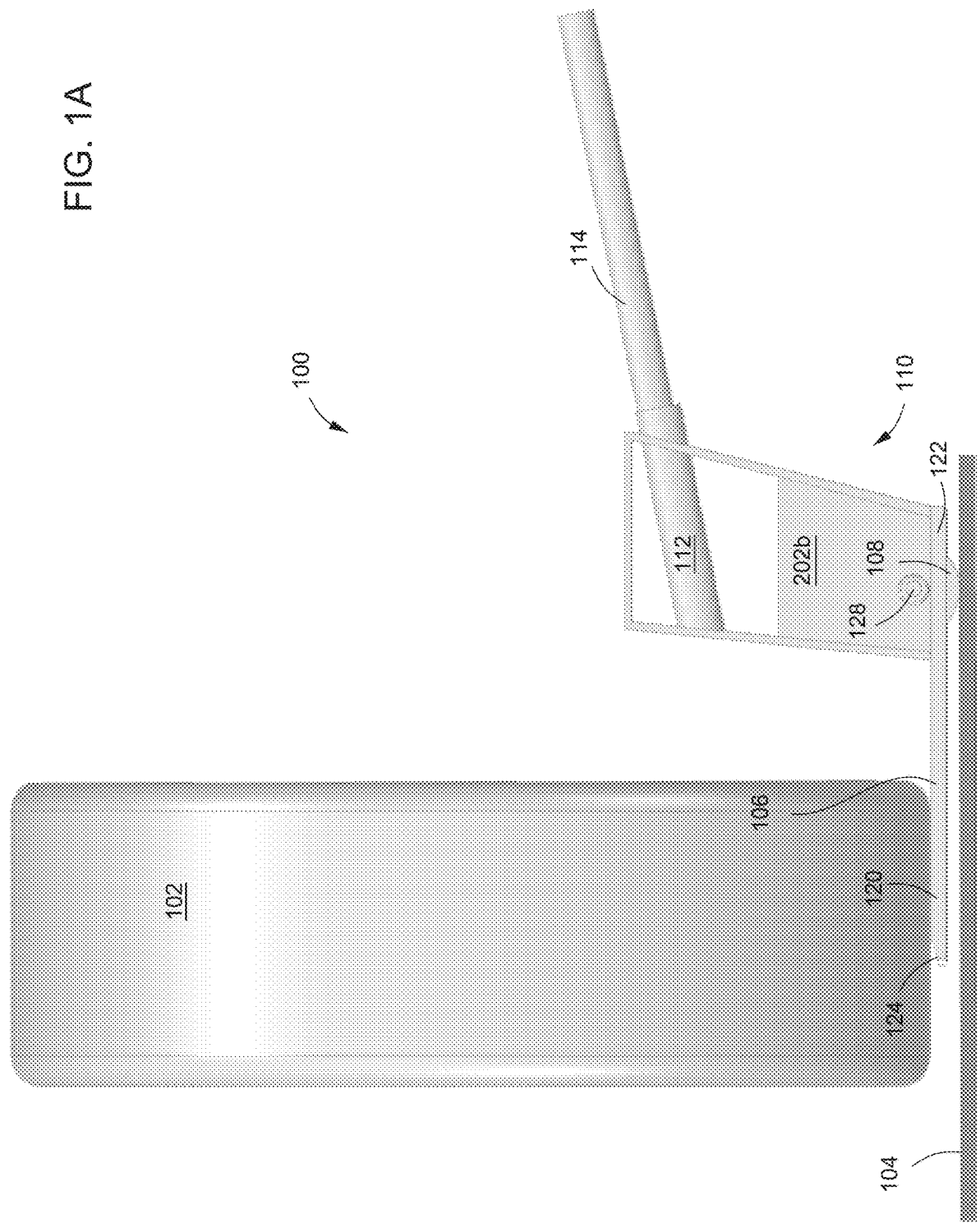

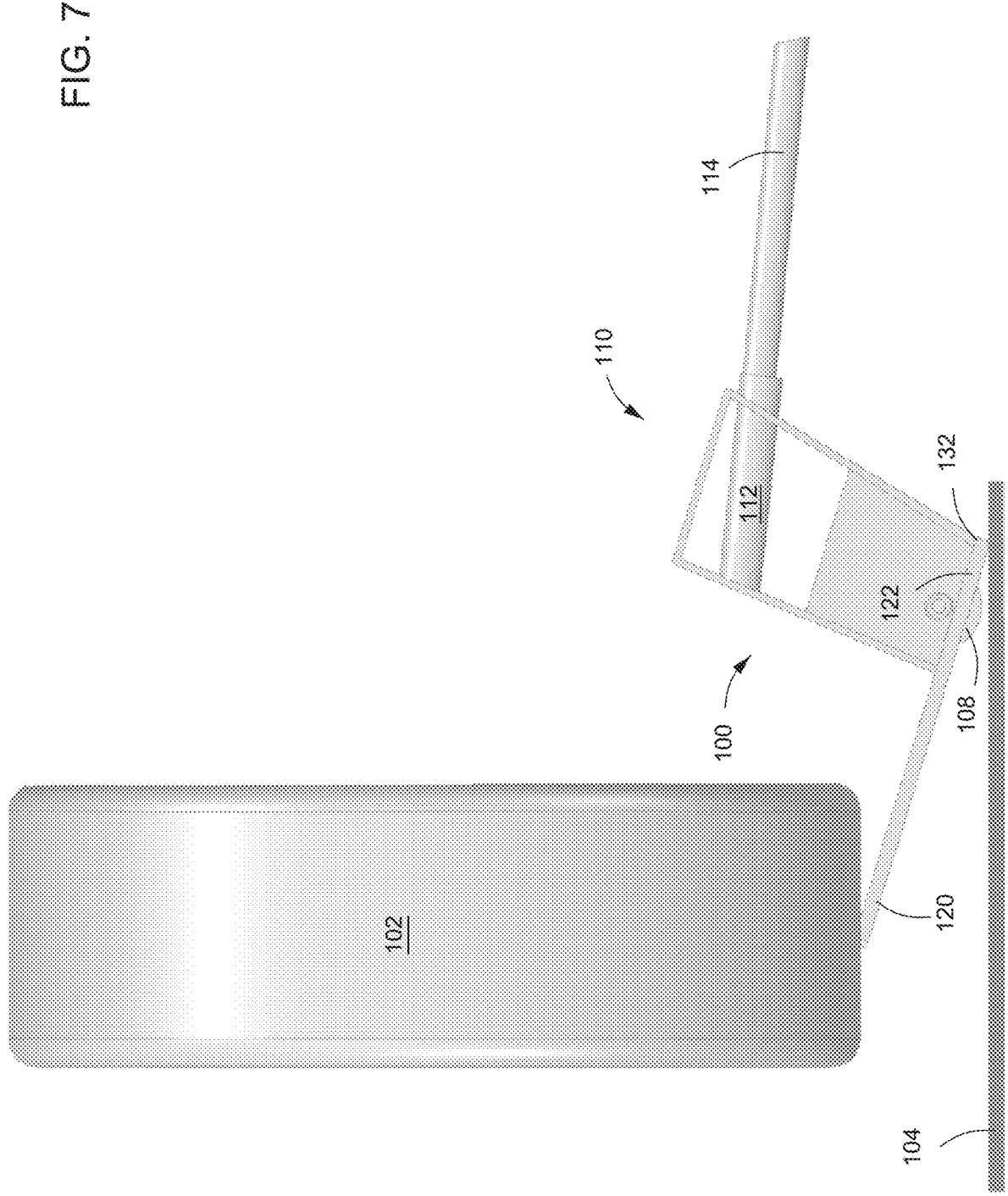

METHODS OF MOVING TIRES TOWARD OR AWAY FROM VEHICLES USING TIRE DOLLY ASSEMBLIES

BACKGROUND

1. Field of Inventions

The field of this application and any resulting patent is tire dolly assemblies.

2. Description of Related Art

Various tire dolly assemblies and methods for removal or installation of tires on vehicles have been proposed and utilized, including some of the methods and structures disclosed in the references appearing on the face of this application or issued patent. However, those methods and structures lack the combination of steps and/or features of the methods and/or structures covered by what is disclosed herein. Furthermore, it is contemplated that the methods and/or structures disclosed herein solve many of the problems that prior art methods and structures have failed to solve. Also, the methods and/or structures disclosed herein have benefits that would be surprising and unexpected to a hypothetical person of ordinary skill with knowledge of the prior art existing as of the filing date of this application.

SUMMARY

The disclosure herein includes one or more methods of tires toward or away from vehicles, each method may include: positioning a portion of a tire dolly assembly beneath the tire, and either moving the tire away from or toward the vehicle using the tire dolly assembly that may include: (a) a base having an upper surface and lower surface, and (b) a protrusion coupled to the base and having a curved surface at least a portion of which extends below the lower surface when the tire dolly assembly is positioned beneath the tire.

The disclosure herein includes one or more methods of tires toward or away from vehicles, each method may include: positioning a tire dolly assembly adjacent the tire, the tire dolly assembly may include: a base having an upper planar surface, a lower planar surface, and a fulcrum adjacent the lower planar surface; a protrusion extending from the lower planar surface away from the upper planar surface; and a strut extending from the upper planar surface away from the lower planar surface; and positioning a portion of the upper planar surface below the tire.

The disclosure herein includes one or more methods of tires toward or away from vehicles, each method may include: positioning a tire dolly assembly adjacent the tire, the tire dolly assembly may include: a base having an upper planar surface, a lower planar surface, and a fulcrum adjacent the lower planar surface; and a strut extending from the upper planar surface of the base; and removably coupling a bar to the strut; positioning a first end of the base below the tire; pushing down on the bar; abutting the upper planar surface against the tire; and abutting the fulcrum against the ground.

The disclosure herein includes one or more methods of tires toward or away from vehicles, each method may include: positioning a tire dolly assembly adjacent the tire, the tire dolly assembly may include: a base having an upper planar surface, a lower planar surface, and a fulcrum adjacent the lower planar surface; a strut extending from the upper planar surface; and one wheel having a portion extending through the base; removably coupling a bar to the strut; rolling the one wheel; positioning the upper planar surface below the tire; pushing down on the bar; pivoting the base; abutting the upper planar surface against the tire; and abutting the fulcrum against the ground.

The disclosure herein includes one or more methods of tires toward or away from vehicles, each method may include: providing a tire dolly assembly that may include: a base having a first end, a second end, wherein the second end has a pivot portion; a strut extending from the second end and an upper surface of the base; a bar removably coupled to the strut; and one wheel having a portion extending through the base and disposed below the strut; rolling the one wheel; positioning the first end of the base below the tire; abutting the first end of the base against the tire; pushing down on the bar; abutting the pivot portion of the second end of the base against the ground; and pivoting the first end on the second end of the base.

The disclosure herein includes a tire dolly assembly for moving a tire toward or away from a vehicle, which tire dolly assembly may include: a base having a first end, a second end, an upper planar surface and a lower planar surface, wherein the second end may have a pivot portion capable of being abutted against the ground; a strut extending from the second end and the upper planar surface of the base; a bar removably coupled to the strut; and one wheel having a portion extending through the base, wherein the center of the wheel may be disposed above the lower planar surface of the base.

BRIEF DESCRIPTION OF THE DRAWINGS

FIG. 1A illustrates a side profile view of a tire and a tire dolly assembly having a wheel coupled to a strut.

FIG. 7 illustrates a side profile view of a tire dolly assembly pivoted at an end of a base.

DETAILED DESCRIPTION

1. Introduction

Figure 1B:
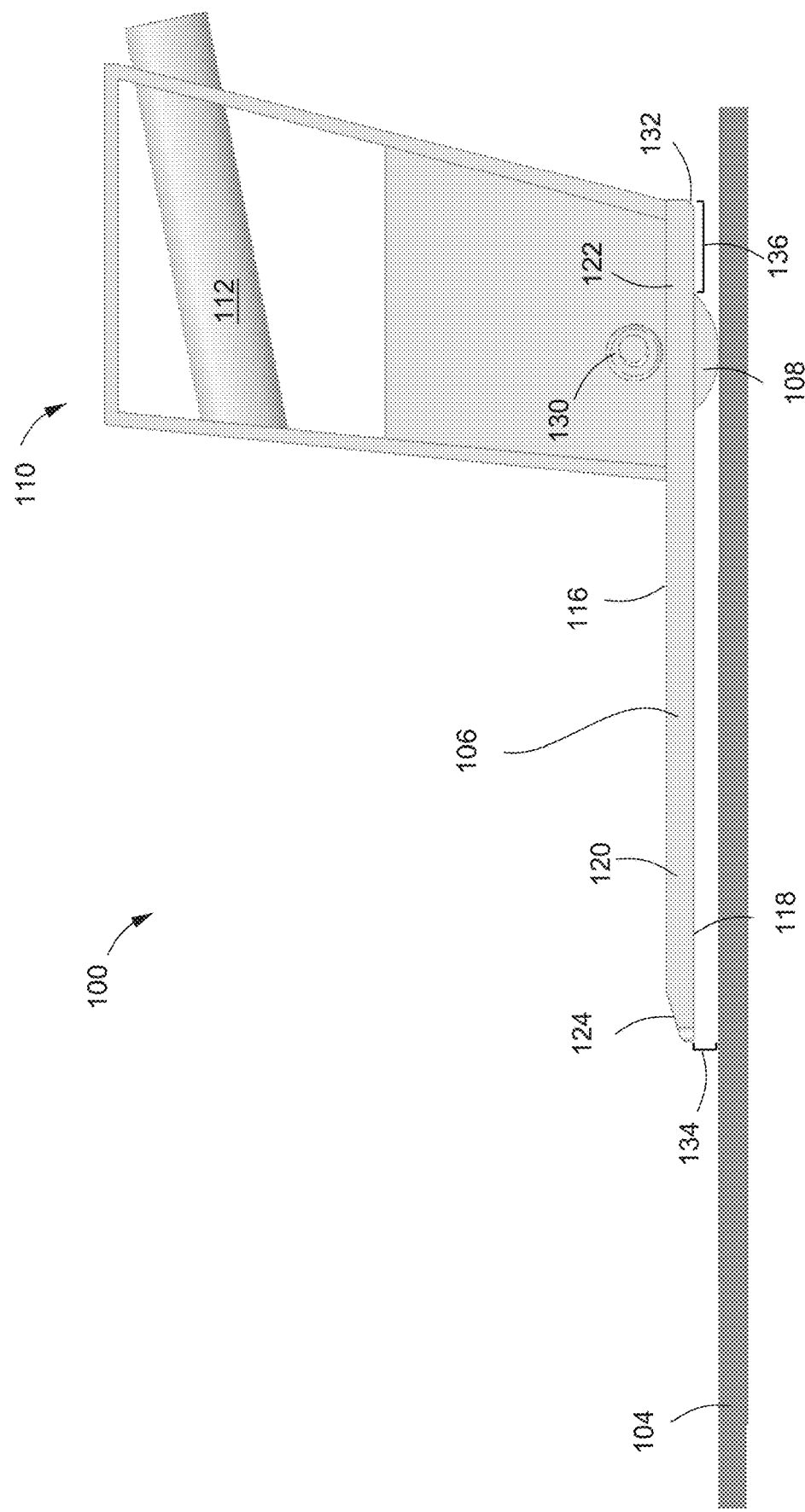
FIG. 1B illustrates a side profile view of a tire dolly assembly set on the ground.

A detailed description will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details, nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

2. Selected Definitions

Certain claims include one or more of the following terms which, as used herein, are expressly defined below.

The term "abut against" as used herein is defined as to either physically touch or press against something, directly or indirectly. After any abutting takes place with one object relative to another object, the objects may be fully or partially "abutted." For example, a first object may be abutted against a second object such that the second object is limited from moving in a direction of the first object. Thus, a fulcrum of a base may be abutted against the ground.

The term "align" as used herein is a verb that means manufacture, form, adjust, or arrange one or more physical objects into a particular position. After any aligning takes place, the objects may be fully or partially "aligned." Aligning preferably involves arranging a structure or surface of a structure in linear relation to another structure or surface; for example, such that their borders or perimeters may share a set of parallel tangential lines. Thus, a base may be aligned with the ground. In certain instances, the aligned borders or perimeters may share a similar profile. For instance, the surface that defines an aperture of a sidewall of a strut may be aligned with a tire. Additionally, apertures may be aligned, such that a structure or portion of a structure may be extended into and/or through the apertures.

The term "aperture" as used herein is defined as any opening in a solid object or structure, e.g., base and/or strut. For example, an aperture may be an opening that begins on one side of a solid object and ends on the other side of the object and can be, for example, a cylindrical opening alone the length of a pipe, tube, or other type of conduit. An aperture may alternatively be an opening that does not pass entirely through an object, but only partially passes through, e.g., as a groove. An aperture can be an opening in an object that is completely circumscribed, defined, or delimited by the object itself. Alternatively, an aperture can be an opening formed when one object is combined with one or more other objects or structures. An aperture may receive an object, e.g., wheel, nuts, bar, and/or bolts. For example, a portion of a wheel may be received in an aperture of a base. Also, an aperture, e.g., opening, of a strut may receive nuts and/or bolts.

The term "assembly" as used herein is defined as any set of components that have been fully or partially assembled together. A group of assemblies may be coupled to form an assembly or a solid structure having an inner surface and an outer surface.

The term "bar" as used herein as a noun is defined as a fully solid or partially solid structure configured to be grasped by a human hand, e.g., a hollow pipe. A bar may include a handle. A bar may be cylindrical and elongated having a first end and a second end where the two ends are separated by the surface of the bar. A bar may be capable of being removably coupled to a strut, e.g., by being inserted into a conduit that is part of the strut or coupled to the strut. A bar may be removably coupled to a strut, e.g., via one or more collapsible pins. A bar may extend through a strut. A bar may be capable of being passed through a strut. A bar may be capable of being slid through a strut. A bar and a strut may be unitary. A bar may have a first set of collapsible pins and a second set of collapsible pins. A bar may have collapsible pins extending radially through the bar and a bar support of a strut. A bar may have collapsible pins pushed inwards clear of a bar support so the bar may be slid relative to the bar support. A bar may be hingedly or rotatably attached to a strut so that the bar may be alternately positioned in a closed position where the bar is for example, parallel with one of the surfaces of the strut, and an open position where the bar is in a position to be used for leverage, as shown in FIG. 1A.

The term "base" as used herein as a noun is defined as a structure to which another structure may be coupled, e.g., a strut or a tire. A base may be cut, molded, 3D-printed, or carved from a single piece of material. A base may be constructed from one or more materials including metal, plastic, carbon, fiber glass, carbon fiber, and wood. A base may be rigid. A base may be capable of ingress, egress, or both, through a space between a tire and the ground. A base may be solid. A base may have a thickness ranging from 4 mm, 5 mm, 6 mm, to 7 mm to 8 mm, 9 mm, or 10 mm or greater. A base may be coupled to a strut. A base may be coupled to a wheel. A base and a strut may be unitary. A base may have a tapered portion. A base may have a fulcrum. A base may have a tapered portion on a first end and a fulcrum on an opposite end. A base may have an aperture receiving a portion of a wheel. A base may be pivoted relative a wheel. A base may be pivoted relative to a fulcrum of the base. Accordingly, a base may have two pivot points, e.g., one at a wheel and one at a fulcrum.

The term "couple" as used herein is defined as directly or indirectly connect or attach. After any coupling takes place with two or more objects, the objects may be fully or partially "coupled." A first object may be coupled to a second object such that the first object is positioned at a specific location and orientation with respect to the second object. For example, a tire may be coupled to a tire dolly assembly. A first object may be either permanently and/or removably to a second object. For example, a base and a strut may be permanently coupled. Two objects may be removably coupled via protrusions, friction, shear pins, threads, tape, rings, hooks, fasteners, locks, male and female connectors, clips, clamps, knots, and/or surface-to-surface contact. For example, a bar and a strut may be removably coupled to each other such that the bar may then be uncoupled and removed from the strut.

The term "cylindrical" as used herein is defined as shaped like a cylinder, e.g., having straight parallel sides and a circular or oval or elliptical cross-section. Examples of a cylindrical structure or object may include a bar and a wheel, e.g., a roller. A cylindrical object may be completely or partially shaped like a cylinder. Alternatively, a solid cylindrical object may have an inner surface or outer surface having a diameter that changes abruptly. A cylindrical object may have an inner or outer surface having a diameter that changes abruptly to form a collar, e.g., flange, radial face, rim, or lip.

The term "end" as used herein as a noun is defined as a portion of a structure having a termination point, line, and/or edge. For example, starting near its center, a base may have an end extending from near the center to an edge of the base. Thus, the end of the base may include a solid portion of the base and the edge where the solid portion terminates.

The terms "first" and "second" as used herein merely differentiate two or more things or actions, and do not signify anything else, including order of importance, sequence, etc.

The term "fulcrum" as used herein is defined as a structure or the edge of a structure, e.g., the edge of a base, on which another structure or object pivots. A fulcrum may be an edge or line segment shared by two surfaces. A fulcrum may be a surface on a structure or object, e.g., base (see 132, FIGS. 1B, 4, and 7).

The terms "he," "she," "they," and any other personal pronouns as used herein refer to any gender interchangeably. For example, all uses of "he" encompasses "she" as well.

The term "perpendicular" as used herein is defined as at an angle ranging from 85° or 88 to 92° or 95°, e.g., to a line, a plane, or a surface. Two structures that are perpendicular to each other may be orthogonal and/or tangential to each other.

The term "pin" as used herein is defined as a structure for use to rotatably couple a wheel to another object or structure, e.g., base or strut. A pin may be cylindrical. A pin may have threads. A pin may extend through a wheel and a base. A pin may extend through a wheel and side surfaces of a base. A pin may extend through a wheel and a strut.

The term "providing" as used herein is defined as making available, furnishing, supplying, equipping, or causing to be placed in position.

Figure 4:
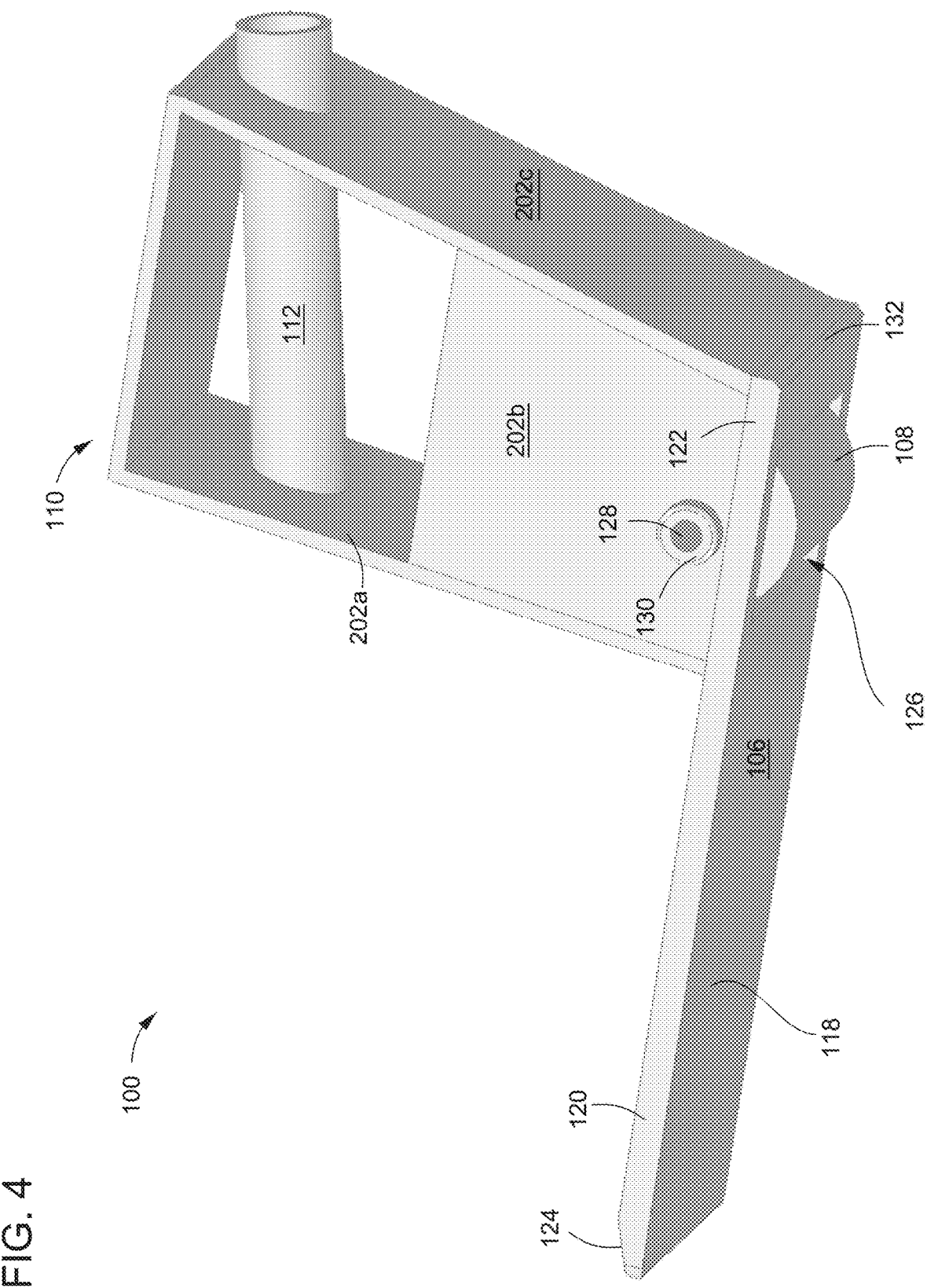
FIG. 4 illustrates a worms-eye perspective view of a tire dolly assembly.

The term "protrusion" as used herein is defined as a structure extending away from another structure or object. A protrusion and a structure or object from which the protrusion extends away may be unitary. A protrusion may be a fulcrum. For example, a base of a dolly assembly have a protrusion extending contiguously from a lower planar surface of the base, in which the dolly assembly may be capable of being pivoted on the protrusion. A protrusion and a structure or object from which the protrusion extends away may be separate objects or structures. A protrusion may be received in an aperture, e.g., of a base. A protrusion may be a wheel, e.g., a roller as shown in FIG. 4. For example, a wheel coupled a base of a dolly assembly may have a portion, i.e., protrusion, protruding through an aperture in the base. Accordingly, the protrusion of the wheel may be rolled.

The term "pushing" as used herein is a verb is defined as applying force, e.g., towards an object or structure, perpendicularly or at an angle. Pushing may compel, e.g., urge, cause, compel, influence, force, and/or press, displacement of an object. After any pushing takes place, the object may be "pushed." A pushed object may be displaced. A pushed object may remain in its original position. An object may be pushed towards or away from another object. For example, a tire dolly assembly may be pushed towards or away from a tire.

The term "sidewall" as used herein is defined as any structure having a planar surface. The sidewall may be a flat plate. A sidewall may be planar. A sidewall may be rigid. A sidewall may be flexible. A sidewall may be curved. A sidewall may form a cylinder. A sidewall may be cylindrical. A sidewall may be continuous. A sidewall may be solid. A sidewall may have curved planar sides that may or, in some cases, may not be parallel to one another. A sidewall may be disposed at an end of a base. A sidewall may have one or more apertures. A sidewall may have one or more apertures disposed therethrough. A sidewall may have an aperture configured to receive a shaft. A sidewall may be constructed from materials including, e.g., plastic, nylon, carbon fiber, fiber glass, ceramic, and metal.

The term "strut" as used herein refers to any type of elongated member, e.g., an elongated structure such as a one or more sidewalls extending from a base. A strut may be cylindrical, polygonal, and/or irregular structure. Additionally, a strut may be a tubular structure, a polygonal cube or prism, or a solid sidewall having irregular contours. A strut may have opposing ends. A strut may be hollow or solid, partially or completely. A strut may be two sidewalls extending from a base. A strut may have one cylindrical sidewall defining an opening. A strut may have three or more sidewalls defining an opening between the sidewalls. One or more sidewalls of a strut may intersect a base to form an angle greater than 90 degrees. One or more sidewalls of a strut may be oblique to a plane of a base. A strut may have a bar support coupled to two sidewalls of the strut. A strut may have a bar support coupled to two opposing sidewalls of the strut. A strut may have a bar support capable of being removably coupled to a bar. A strut may be removably coupled to a bar. A strut may have an aperture capable of receiving a bar. A strut may have an aperture through which a bar may pass. A strut may have an aperture extending in a direction oblique to a base. A strut and a base may be unitary.

The term "surface" as used herein is defined as any face of a structure. A surface may also refer to that flat or substantially flat area that is extended radially around a cylindrical structure which may, for example, be part of a wheel or a bar. A surface may also refer to that flat or substantially flat area extending radially around a cylindrical structure or object which may, for example, be part of a base and/or a strut. A surface may have irregular contours. A surface may be formed from coupled components, e.g., base and/or a strut. Coupled components may form irregular surfaces. A plurality of surfaces may be connected to form a polygonal cross-section. An example of a polygonal cross-section may be triangular, square, rectangular, pentagonal, hexagonal, or octagonal.

The term "tapered" as used herein is defined as having a surface and/or profile defining a set of edges extending towards an intersection point. Structures that are tapered may have a profile that is beveled, radiused, triangular, frustoconical, and/or conical.

The term "tire" as used herein is defined as cylindrical structure configured for rotatable coupling to another structure, e.g., an axle of a car, a truck, a van, or a tractor. A tire may be a type of wheel. A tire may be capable of rolling. A tire may have a rubber outer surface. A tire may have an inner tube. A tire may be inflatable. A tire may be capable of rotating on its central axis. A tire may include a hub and spokes extending from the hub. A tire may have a hub capable of receiving bolts of a vehicle. A tire may include a rim.

The term "tire dolly assembly" as used herein is defined as an assembly that is capable of being used to move a tire. A tire dolly assembly may include a base, a wheel, a strut, and a bar. A tire dolly assembly may be capable of being at two different pivot points, e.g., one at a wheel and one at a fulcrum of a base.

The term "tubular" as used herein as an adjective is defined as a having an inner surface and an outer surface. A tubular structure may have an aperture disposed therethrough. Examples of a tubular may a bar. Preferably, a tubular structure is cylindrical. However, any or all tubular structures of an assembly may have polygonal cross-sections, e.g., triangular, rectangular, pentagonal, hexagonal, or octagonal.

The term "unitary" as used herein is defined as having the nature, properties, or characteristics of a single unit. For example, one or more sidewalls that are individual parts of a strut may be unitary in the sense they are not separate but rather are formed from a single piece of material, e.g., plastic, nylon, carbon fiber, ceramic, or metal. In addition, a strut that is an individual part may be unitary with a base in the sense they are not separate but rather are formed from a single piece of material, e.g., plastic, nylon, carbon fiber, fiber glass, ceramic, wood, or metal.

The terms "upper," "lower," "top," "bottom", "front", "back" as used herein are relative terms describing the position of one object, thing, or point positioned in its intended useful position, relative to some other object, thing, or point also positioned in its intended useful position, when the objects, things, or points are compared to distance from the center of the earth. The term "upper" identifies any object or part of a particular object that is farther away from the center of the earth than some other object or part of that particular object, when the objects are positioned in their intended useful positions. The term "lower" identifies any object or part of a particular object that is closer to the center of the earth than some other object or part of that particular object, when the objects are positioned in their intended useful positions. For example, a base and a strut may each have an upper planar surface and a lower planar surface. The term "top" as used herein means in the highest position, e.g., farthest from the ground. The term "bottom" as used herein means in the lowest position, e.g., closest the ground. For example, a cylindrical object, e.g., a bar and wheel, may have a top portion and a bottom portion. The term "front" identifies any object or part of a particular object that is closest to a person viewing the object. The term "back" identifies any object or part of a particular object that is closest to a person viewing the object.

The term "wheel" as used herein is defined as cylindrical structure configured for rotatable coupling to another structure. A wheel may be capable of rolling. A wheel may be capable of rotating on its central axis. A wheel may be a fulcrum. Pushing, pulling, and/or pivoting an object or structure coupled to a wheel may cause the wheel to turn, e.g., roll.

3. Certain Specific Embodiments

Certain specific embodiments of methods, structures, elements, and parts are described below, which are by no means an exclusive description of the inventions. Other specific embodiments, including those referenced in the drawings, are encompassed by this application and any patent that issues therefrom.

The disclosure herein includes one or more methods of tires toward or away from vehicles, each method may include: positioning a portion of a tire dolly assembly beneath the tire, and either moving the tire away from or toward the vehicle using the tire dolly assembly that may include: (a) a base having an upper surface and lower surface, and (b) a protrusion coupled to the base and having a curved surface at least a portion of which extends below the lower surface when the tire dolly assembly is positioned beneath the tire.

The disclosure herein includes one or more methods of tires toward or away from vehicles, each method may include: positioning a tire dolly assembly adjacent the tire, the tire dolly assembly may include: a base having an upper planar surface, a lower planar surface, and a fulcrum adjacent the lower planar surface; a protrusion extending from the lower planar surface away from the upper planar surface; and a strut extending from the upper planar surface away from the lower planar surface; and positioning a portion of the upper planar surface below the tire.

The disclosure herein includes one or more methods of tires toward or away from vehicles, each method may include: positioning a tire dolly assembly adjacent the tire, the tire dolly assembly may include: a base having an upper planar surface, a lower planar surface, and a fulcrum adjacent the lower planar surface; and a strut extending from the upper planar surface of the base; and removably coupling a bar to the strut; positioning a first end of the base below the tire; pushing down on the bar; abutting the upper planar surface against the tire; and abutting the fulcrum against the ground.

The disclosure herein includes one or more methods of tires toward or away from vehicles, each method may include: positioning a tire dolly assembly adjacent the tire, the tire dolly assembly may include: a base having an upper planar surface, a lower planar surface, and a fulcrum adjacent the lower planar surface; a strut extending from the upper planar surface; and one wheel having a portion extending through the base; removably coupling a bar to the strut; rolling the one wheel; positioning the upper planar surface below the tire; pushing down on the bar; pivoting the base; abutting the upper planar surface against the tire; and abutting the fulcrum against the ground.

The disclosure herein includes one or more methods of tires toward or away from vehicles, each method may include: providing a tire dolly assembly that may include: a base having a first end, a second end, wherein the second end has a pivot portion; a strut extending from the second end and an upper surface of the base; a bar removably coupled to the strut; and one wheel having a portion extending through the base and disposed below the strut; rolling the one wheel; positioning the first end of the base below the tire; abutting the first end of the base against the tire; pushing down on the bar; abutting the pivot portion of the second end of the base against the ground; and pivoting the first end on the second end of the base.

The disclosure herein includes a tire dolly assembly for moving a tire toward or away from a vehicle, which tire dolly assembly may include: a base having a first end, a second end, an upper planar surface and a lower planar surface, wherein the second end may have a pivot portion capable of being abutted against the ground; a strut extending from the second end and the upper planar surface of the base; a bar removably coupled to the strut; and one wheel having a portion extending through the base, wherein the center of the wheel may be disposed above the lower planar surface of the base.

In any one of the methods or structures disclosed herein, the protrusion may include a wheel with an axel and the curved surface is a cylindrical surface that revolves around the axel.

In any one of the methods or structures disclosed herein, the wheel may be a cylindrical roller with an axle and a circumferential surface protruding from the lower surface away from the upper planar surface.

In any one of the methods or structures disclosed herein, the tire dolly assembly additionally may include a strut coupled to the base.

In any one of the methods or structures disclosed herein, the tire dolly assembly may additionally include a strut that includes an aperture capable of receiving a bar so that when the bar is inserted into the aperture and a downward force is exerted on the bar, at least a portion of the upper surface of the base would move upward and against a surface of the tire being moved.

In any one of the methods or structures disclosed herein, the tire dolly assembly includes strut; the base includes a first end edge, a second end edge opposite the first end edge, and at least two side edges, and In any one of the methods or structures disclosed herein, the centerline of the strut may be oblique to a plane of the base.

In any one of the methods or structures disclosed herein, the center line of the strut may be oblique to the upper planar surface.

In any one of the methods or structures disclosed herein, a wall of the strut and the upper planar surface of base may form an angle greater than 90 degrees.

In any one of the methods or structures disclosed herein, the strut and the base may be unitary.

In any one of the methods or structures disclosed herein, the strut may be hollow.

In any one of the methods or structures disclosed herein, the strut may be cylindrical.

In any one of the methods or structures disclosed herein, the strut may have four walls.

In any one of the methods or structures disclosed herein, the center of the one wheel may be disposed above the lower planar surface.

In any one of the methods or structures disclosed herein, the one wheel may be rotatably coupled to the strut.

In any one of the methods or structures disclosed herein, the one wheel may be rotatably coupled to the base.

In any one of the methods or structures disclosed herein, a portion of the one wheel may be disposed in an aperture of the base.

In any one of the methods or structures disclosed herein, a portion of the one wheel may be disposed within the strut.

Any one of the methods or structures disclosed herein the protrusion may further include a wheel having a center disposed above the lower surface of the base.

In any one of the methods or structures disclosed herein, the base may be capable of being pivoted at the pivot portion of the second end.

In any one of the methods or structures disclosed herein, the base may have an aperture receiving a portion of the wheel.

In any one of the methods or structures disclosed herein, the strut may have an opening capable of receiving a pin.

In any one of the methods or structures disclosed herein, a portion of the one wheel may be disposed in the strut.

In any one of the methods or structures disclosed herein, a portion of the one wheel may be disposed in an opening of the strut.

In any one of the methods or structures disclosed herein, a portion of the one wheel may be disposed below the strut.

In any one of the methods or structures disclosed herein, an outer edge of the one wheel extends through the lower planar surface of the wheel at first distance, wherein the center of the wheel may be disposed at a second distance between the center of the wheel and the pivot portion of the base, wherein the first distance may be less than the second distance.

In any one of the methods or structures disclosed herein, wherein the bar may be oblique to the centerline of the strut.

In any one of the methods or structures disclosed herein, the tire dolly assembly may further include a pin extending through a wheel and side surfaces of the base.

In any one of the methods or structures disclosed herein, the tire dolly assembly may further include a pin extending through a wheel, side surfaces of the base, and an aperture in the base disposed between the side surfaces.

Any one of the methods or structures disclosed herein may further include storing one or more bolts in an aperture of the strut.

Any one of the methods or structures disclosed herein may further include extending a portion of a bar through the strut.

Any one of the methods or structures disclosed herein may further include coupling a bar to the strut.

Any one of the methods or structures disclosed herein may further include rolling the protrusion.

Any one of the methods or structures disclosed herein may further include pivoting the tire dolly assembly on the fulcrum.

Any one of the methods or structures disclosed herein may further include displacing the tire dolly assembly by rolling the one wheel.

Any one of the methods or structures disclosed herein may further include raising the protrusion a distance from the ground.

Any one of the methods or structures disclosed herein may further include raising the one wheel a distance from the ground.

4. Specific Embodiments in the Drawings

The drawings presented herein are for illustrative purposes only and do not limit the scope of the disclosure. Rather, the drawings are intended to help enable one having ordinary skill in the art to make and use the assemblies disclosed herein.

This section addresses specific versions of tire dolly assemblies and methods for removal or installation of tires on vehicles. Although this section focuses on the drawings herein, and the specific versions found in those drawings, parts of this section may also have applicability to other versions not shown in the drawings. The limitations referenced in this section should not be used to limit the scope of the versions themselves, which have broader applicability.

Although the methods, structures, elements, and parts described herein have been described in detail, it should be understood that various changes, substitutions, and alterations can be made without departing from the spirit and scope of the inventions as defined by the following claims. Those skilled in the art may be able to study the preferred embodiments and identify other ways to practice the inventions that are not exactly as described herein. It is the intent of the inventor that variations and equivalents of the inventions are within the scope of the claims, while the description, abstract and drawings are not to be used to limit the scope of the inventions. The inventions is specifically intended to be as broad as the claims below and their equivalents.

Figure 2:
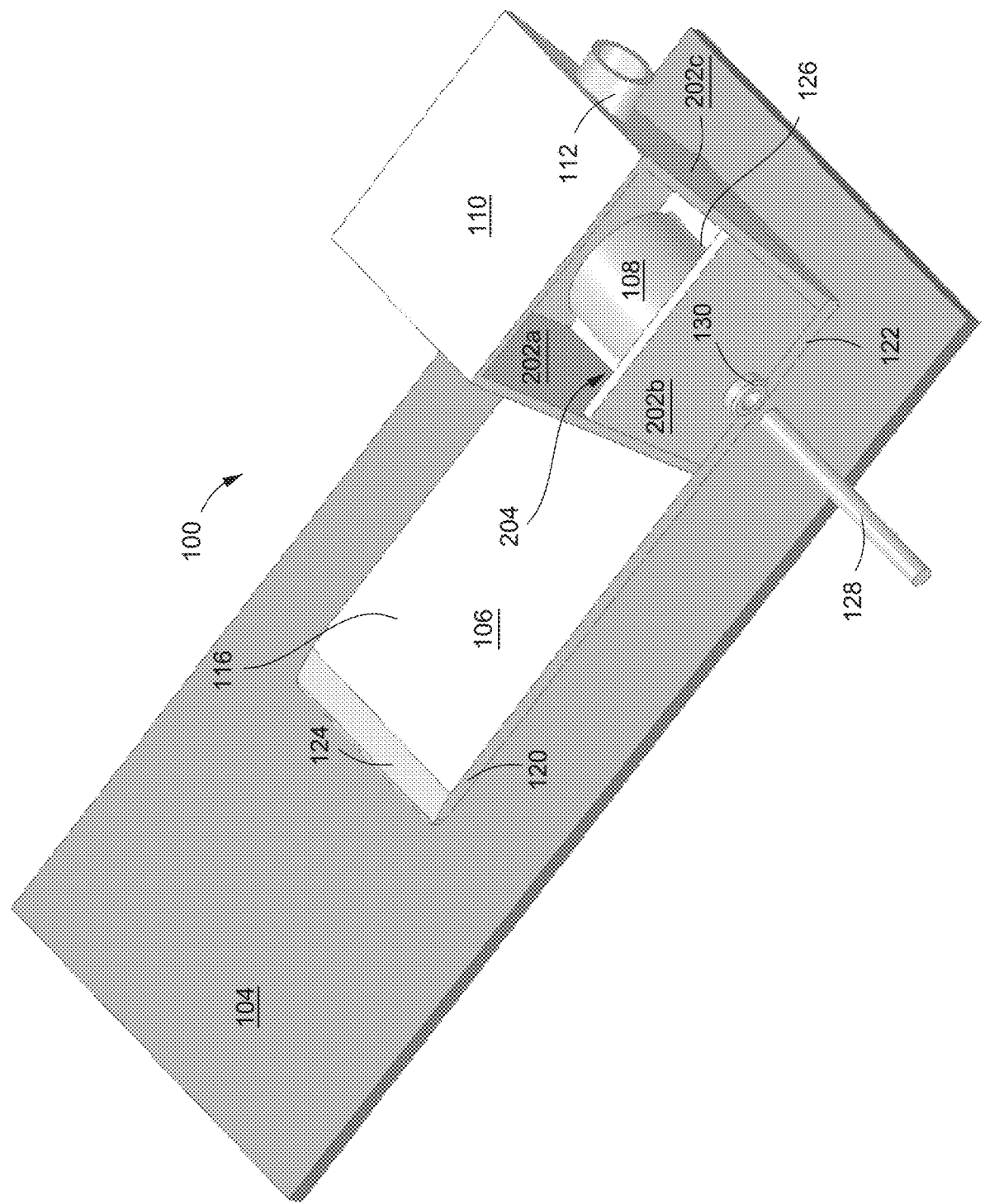
FIG. 2 illustrates a birds-eye perspective view of a tire dolly assembly set on the ground.
Figure 3:
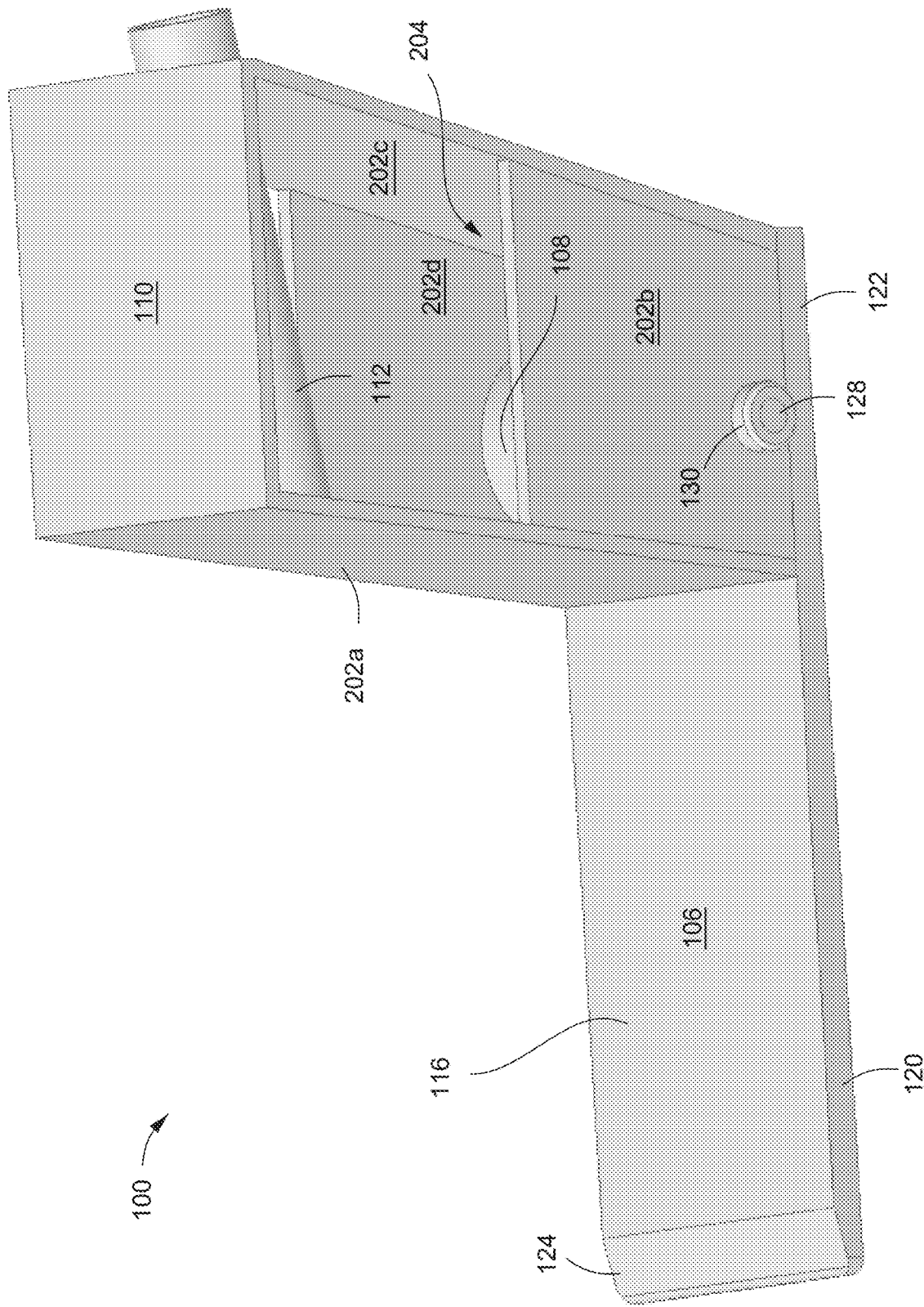
FIG. 3 illustrates a birds-eye perspective view of a tire dolly assembly.

FIG. 1A illustrates a side profile view of a tire 102 and a tire dolly assembly 100 having a wheel 108 coupled to a strut 110. FIG. 1B illustrates a side profile view of a tire dolly assembly 100 set on the ground 104, e.g., a level surface, a floor, a garage floor, a street, a road shoulder, or any surface a vehicle can be driven on. FIG. 2 illustrates a birds-eye perspective view of a tire dolly assembly 100 set on the ground 104. FIG. 3 illustrates a birds-eye perspective view of a tire dolly assembly. FIG. 4 illustrates a worms-eye perspective view of a tire dolly assembly.

Referring to FIGS. 1-4, a tire assembly 100 may include a base 106, a wheel 108, a strut 110, a bar support 112, and a bar 114. The base 106 may be a substantially flat plate. The base 106 may be constructed from a rigid material, e.g., metal, plastic, or carbon fiber.

The base 106 may have an upper planar surface 116 and a lower planar surface 118. The upper planar surface 116 and the lower planar surface 118 may be parallel. The base 106 may have a first end 120 and a second end 122.

The first end 120 may have a tapered lip 124. Thus, the tapered lip 124 may be less thick than other portions of the base 106. In some cases where the distance between a tire 102 and the ground 104 may be less than the thickest portion of the base 106, the tapered lip 124 may provide a point of entry for pushing the base 106 farther between the tire 102 and the ground 104. (see FIG. 6).

The second end 122 may have a fulcrum 132 capable of being abutted against the ground 104 (see FIG. 7).

A wheel 108 may be rotatably coupled to the base 106. A portion of the wheel 108 may be disposed within an aperture 126 of the base 106. The wheel 108 may have an aperture (not shown) extending axially therethrough. Accordingly, the pin 128 may extend through the base 106 and the aperture of the wheel 108. Thus, the wheel 108 may be rotatably coupled to the base 106 via the pin 128.b Nuts 130 may be coupled to ends of the shaft 12. The ends of the pin 128 may be threaded (not shown). Thus, the nuts 130 may, in some cases, inhibit the pin 128 from egress from the wheel 108 and/or the base 106.

When the wheel 108 is set on the ground 104 and the lower planar surface 118 of the base 106 is parallel to the ground 104, the lower planar surface 118 would have a first distance 134 from the ground 104 (see FIG. 1A). Additionally, the wheel 108 may be positioned relative to the base 106 such that a second distance 136 exists between an outer surface of the wheel 108 and the fulcrum 132 of the base 106 (see FIG. 1A). The second distance 136 may be greater than the first distance 134. Accordingly, the base 106 may be capable of being pivoted at the wheel 108 until the fulcrum 132 is abutted against the ground 104.

Additionally, the strut 110 may extend from the upper planar surface 116 of the base 106. The strut 110 may be coupled, e.g., welded, to the upper planar surface 116 of the base 106. The strut 110 may have four sidewalls 202a-d. The sidewalls 202a, 202c may each intersect the base to form an angle greater than 90 degrees. The sidewalls 202a, 202c may each be oblique to a plane of the base 106.

The sidewalls 202a-d may be coupled, e.g., welded, to define an opening 204 (see FIG. 2 and FIG. 3). The opening 204 may receive a portion of the wheel 108. In addition, the opening 204 may receive nuts or bolts (not shown), e.g., for storage.

The bar support 112 may be coupled to the sidewalls 202a, 202c. The bar support 112 may be cylindrical. The bar support 112 having an opening capable of receiving the bar 114. The bar support 112 and the bar 114 may be coupled via one or more pins (not shown) extended radially through the bar 114 and the bar support 112. The pins may be pushed inwards towards the center line of the bar 114. The pins may be pushed inwards clear of the bar support 112 so the bar 114 may be slid relative to the bar support 112.

Accordingly, the bar 114 may extend from the strut 110 in a direction opposite the base 106. The bar 114 may intersect the sidewall 202a to form an angle greater than 90 degrees. Also, the bar 114 may intersect the sidewall 202c to form an angle greater than 90 degrees. Thus, the bar 114 may be oblique to a plane of each of the sidewalls 202a, 202c. Furthermore, the bar 114 may be oblique to a plane of the base 106. In other words, the bar 114 may extend from the strut 110 in a direction away from the ground 104.

Compared to extending parallel to or towards the ground 104, the bar 114 extending away from the ground 104, e.g., oblique to the strut 110, may reduce the distance a person has to bend down to grasp the bar 114. Had the bar 114 extend parallel to or towards the ground 104, the person would have to bend down farther to grasp the bar 114. Accordingly, reducing the distance a person has to bend towards the ground 104 may reduce the person's risk of back injury while operating the tire dolly assembly 100.

In addition to the bar 114 extending away from the ground 104, having the strut 110 extending oblique to the base 106 may provide leverage for a person to pivot the tire dolly assembly 100 on the fulcrum 132. Moreover, the bar 114 extending oblique to the base 106 and/or the ground 104 may be pressed, e.g., by a human hand, farther towards the ground 104 compared to the bar 114 extending parallel to or towards the ground 104. In other words, the bar 114 extending oblique to the base 106 and/or the ground 104 may provide for a greater pivot angle compared to the bar 114 extending parallel to or towards the ground 104.

Figure 5:
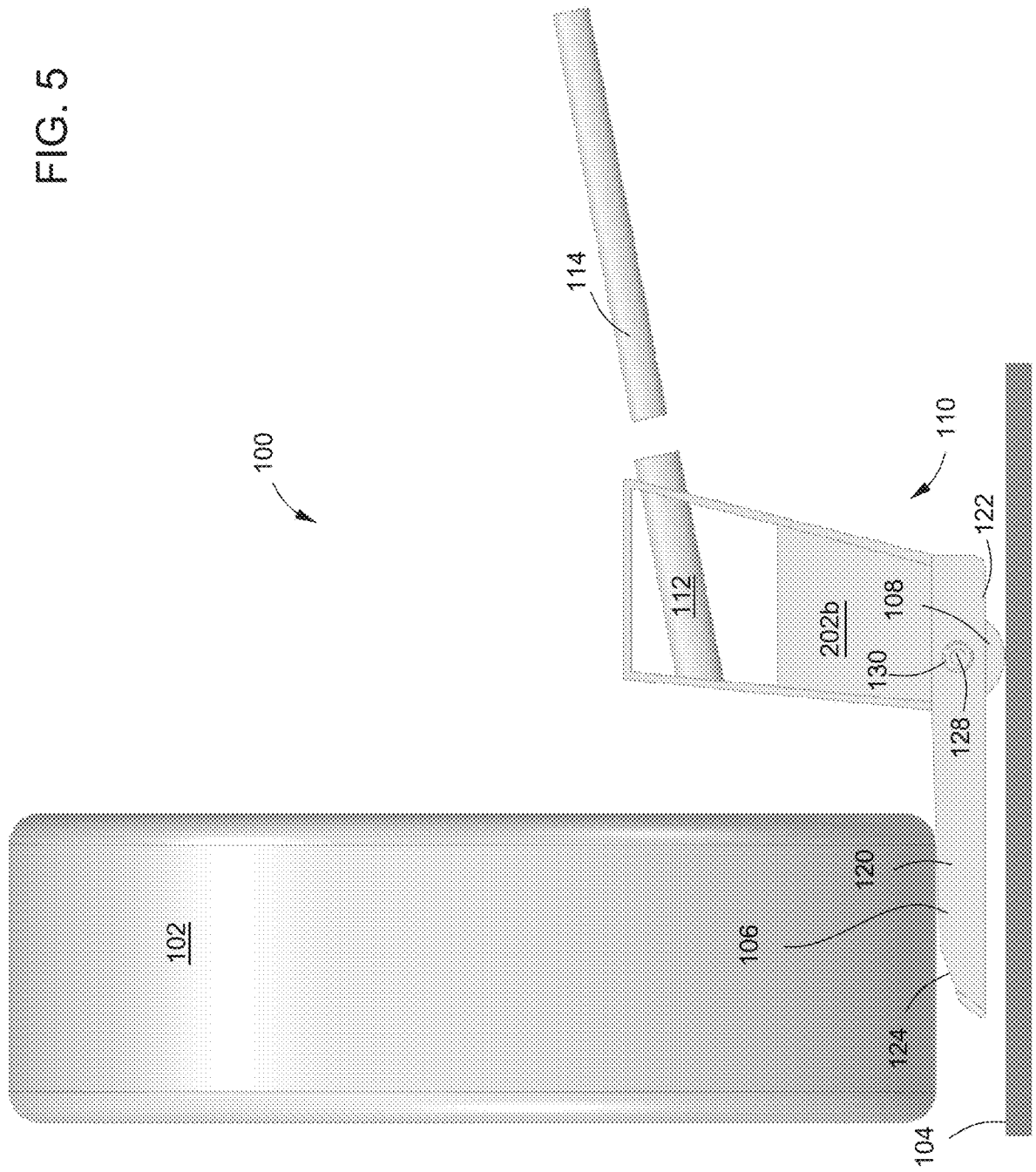
FIG. 5 illustrates a side profile view of a tire and a tire dolly assembly having a wheel coupled to a base.

FIG. 5 illustrates a side profile view of a tire 102 and a tire dolly assembly 100 having a wheel 108 rotatably coupled to a base 106. The base 106 may have an upper planar surface 116 and a lower planar surface 118. The upper planar surface 116 and the lower planar surface 118 may be parallel. The base 106 may have a first end 120 and a second end 122.

The first end 120 may have a tapered lip 124. Thus, the tapered lip 124 may less thick than other portions of the base 106. In some cases where the distance between a tire 102 and the ground 104 may be less than the thickest portion of the base 106, the tapered lip 124 may provide a point of entry for pushing the base 106 farther between the tire 102 and the ground 104. (see FIG. 6).

A wheel 108 may be rotatably coupled to the base 106. The wheel 108 may be disposed proximate the second end 122 of the base 106. The wheel 108 may have a center disposed above the lower planer surface 118 of the base 106.

A portion, e.g., center, of the wheel 108 may be disposed within an aperture 126 of the base 106. Accordingly, the portion of wheel 108 may be disposed between sidewalls of the base 106. The wheel 108 may have an aperture (not shown) extending therethrough axially. Accordingly, the pin 128 may extend through the base 106 and the aperture of the wheel 108. Thus, the wheel 108 may be rotatably coupled to the base 106 via the pin 128.

Nuts 130 may be coupled to ends of the pin 128. The ends of the pin 128 may be threaded (not shown). Thus, the nuts 130 may, in some cases, inhibit the pin 128 from egress from the wheel 108 and/or the base 106.

Additionally, the wheel 108 may extend into an opening 204 of a strut 110 (see FIG. 2 and FIG. 3). The wheel 108 may have a portion disposed between sidewalls 202a-d of the strut 110. The sidewalls 202a-d may define the opening 204. Also, the opening 204 may receive nuts or bolts (not shown).

Figure 6:
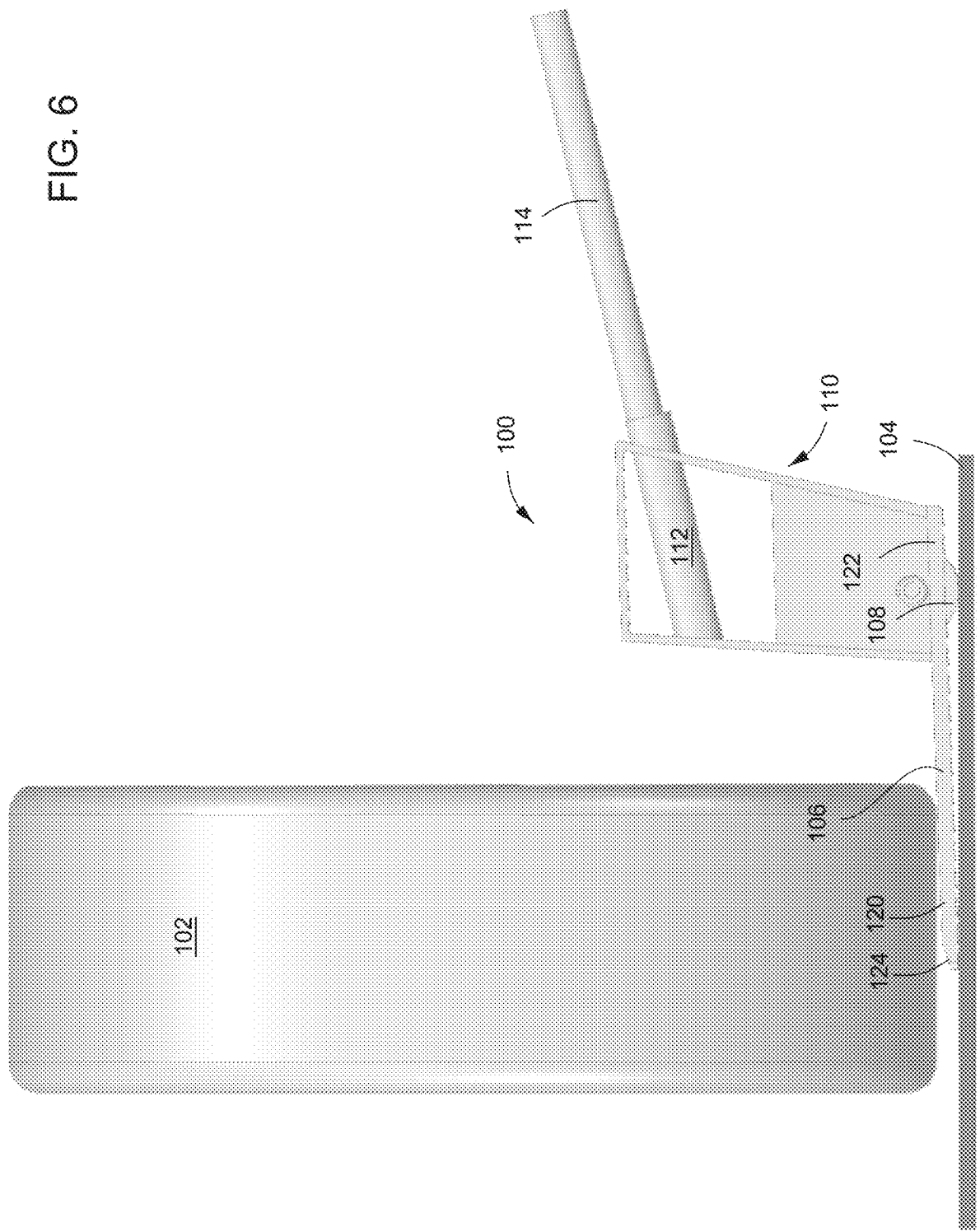
FIG. 6 illustrates a side profile view of a tire dolly assembly having a base slid between a tire and the ground.

FIG. 6 and FIG. 7 illustrate how a tire dolly assembly 100 may be used to remove or install a tire 102.

FIG. 6 illustrates a side profile view of a tire dolly assembly 100 having a base 106 slid between a tire 102 and the ground 104. The tire 100 may be coupled to a vehicle (not shown), e.g., car, van, or truck. The vehicle may be raised via a jack (not shown). Hence, the tire 100 may be slightly elevated above the ground 104. Accordingly, a slight space may exist between the tire 100 and the ground 104. The space may only be as high as the thickness of the base 106. Because the base 106 may have a thickness ranging from 4 mm, 5 mm, 6 mm, or 7 mm to 8 mm, 9 mm, or 10 mm or greater, the tire 100 may only have to be positioned a distance from the ground 104 about the thickness of the base 106.

To remove the tire 102 from the vehicle, a person must first remove lug nuts (not shown) keeping the tire 102 coupled to the vehicle. To avoid misplacing the lug nuts, the person may store the lug nuts in an opening 204 (see FIG. 2 and FIG. 3) of the strut 110 of the tire dolly assembly 100. Then, the person may position a tapered lip 124 of the base 106 between the tire 102 and the ground 104.

Next, the person may push a first end 120 of the base 106 (including the tapered lip 124) forward farther between the tire 102 and ground 104. The person may push the tire dolly assembly 100, as well as the base 106, via a bar 114.

Afterwards, the person may pull the tire 102 from the vehicle (assuming all lug nuts have been removed). The tire 102 may fall a short distance onto the base 106.

The person may push down on the bar 114 to keep the base 106 parallel to the ground 104 (see FIG. 1 and FIG. 5) or, at least, from physically touching the ground 104. The person may move the tire 102 on the tire dolly assembly 100 by pushing, pull, and/or pivoting the bar 114. Accordingly, the tire dolly assembly 100 may roll on the wheel 108.

FIG. 7 illustrates a side profile view of a tire dolly assembly 100 pivoted at an end of a base 106, e.g., to lift a tire 102. To install the tire 102 onto a vehicle (not shown), a person may first position, e.g., roll, the tire 102 onto a first end 120 of a base 106 of the tire dolly assembly 100.

Next, the person may push down on the bar 114 to keep the base 106 parallel to the ground 104 (see FIG. 1 and FIG. 5). Additionally, the person may move the tire 102 on the tire dolly assembly 100 by pushing, pull, and/or pivoting the bar 114. Accordingly, the tire dolly assembly 100 may roll on the wheel 108, the tire 102 is position near the vehicle.

Then, the person may apply additional force onto the bar 114 until a fulcrum 132 of a second end of the base 106 is abutted against the ground 104. The person may continue applying force to cause the tire dolly assembly 100 to pivot at the fulcrum 132. Accordingly, an upper end of a strut 110 of tire dolly assembly 100 may be pivoted away from the vehicle. Additionally, a first end 120 of the dolly assembly 100, the wheel 108, and/or the tire 102 may be raised a distance from ground. Particularly, the distance of the tire 102 may only have to be positioned a distance from the ground 104 about the thickness of the base 106. The distance of the tire 102 from the ground 104 may range from 4 mm, 5 mm, 6 mm, or 7 mm to 8 mm, 9 mm, or 10 mm or greater.

In some cases, because the wheel 108 may be raised off the ground 104 and the fulcrum 132 of the base 106 may be abutted against the ground 104, the tire dolly assembly 100 may only be capable of pivoting on the fulcrum 132. In such cases, the tire dolly assembly 100 may be inhibited from being moved or slid, e.g., laterally and/or axially, because the fulcrum 132 may be in physical contact with the ground.

Afterwards, the person may tilt the tire 102 towards bolts (not shown) on the vehicle until a hub of the tire 102 receives and rests on the bolts. The bolts may extend through the hub of the tire 102 (not shown). The person may then raise the bar 114 to lower first end 120 of away from the tire 102. The person may pull the tire dolly assembly 100 (via the bar 114) away from the tire 102.

Later, the person may threadably couple lug nuts to the bolts extending through the tire 102 to secure the installed tire 102 against the vehicle.

What is claimed as the invention is:

1. A method of moving a tire toward or away from a vehicle using a tire dolly assembly, comprising:
    positioning a portion of the tire dolly assembly beneath the tire, and either moving the tire away from or toward the vehicle using the tire dolly assembly that comprises:
        a base having:
            an upper surface;
            a lower surface;
            a first end; and
            a second end; and
        a protrusion coupled to the base and having a curved surface wherein at least a first portion of the curved surface extends through an opening in the lower surface and a second portion of the curved surface extends through an opening in the upper surface;
        wherein positioning a portion of the tire dolly assembly beneath the tire comprises disposing the lowest portion of the tire on the upper surface; and
    pushing the second end down to raise the first end and the protrusion toward the tire.

2. The method of claim 1, wherein the protrusion comprises a wheel with an axel and the curved surface is a cylindrical surface that revolves around the axel.

3. The method of claim 2, wherein the wheel is a cylindrical roller with an axle and a circumferential surface protruding from the lower surface away from the upper planar surface.

4. The method of claim 1, wherein the tire dolly assembly further comprises a pin extending through a wheel and side surfaces of the base.

5. The method of claim 1, wherein the tire dolly assembly further comprises a strut coupled to the base.

6. The method of claim 1, wherein the tire dolly assembly further comprises a strut that includes an aperture capable of receiving a bar so that when the bar is inserted into the aperture, and a downward force is exerted on the bar, at least a portion of the upper surface of the base moves upward and against a surface of the tire being moved.

7. A method of removing or installing a tire from or on a vehicle, comprising:
    positioning a tire dolly assembly adjacent the tire, the tire dolly assembly comprising:
        a base having an upper planar surface, a lower planar surface, a first end, a second end, and a fulcrum adjacent the lower planar surface;

a protrusion extending through an opening in the lower planar surface and the upper planar surface; and a strut extending from the upper planar surface away from the lower planar surface; and positioning a portion of the upper planar surface below the tire, comprising abutting the lowest portion of the tire against the upper planar surface; and pushing the strut down to raise the first end and the protrusion toward the tire.

8. The method of claim 7, wherein the center line of the strut is oblique to the upper planar surface.

9. The method of claim 7, wherein a wall of the strut and the upper planar surface of base form an angle greater than 90 degrees.

10. The method of claim 7, further comprising storing one or more bolts in an aperture of the strut.

11. The method of claim 7, further comprising coupling a bar to the strut.

12. The method of claim 7, further comprising rolling the protrusion.

13. The method of claim 7, further comprising pivoting the tire dolly assembly on the fulcrum.

14. A method of removing or installing a tire on a vehicle, comprising:

positioning a tire dolly assembly adjacent the tire, the tire dolly assembly comprising:

a base having an upper planar surface, a lower planar surface, a first end, a second end, and a fulcrum adjacent the lower planar surface;

a strut extending from the upper planar surface; and one wheel having a portion extending through the base;

removably coupling a bar to the strut;

rolling the one wheel;

positioning the upper planar surface below the lowest portion of the tire;

pushing down on the bar to push the second end down and to raise the first end and the wheel;

abutting the upper planar surface against the lowest portion of the tire; and abutting the fulcrum against the ground.

15. The method of claim 14, wherein the center of the one wheel is disposed above the lower planar surface.

16. The method of claim 14, wherein the one wheel is rotatably coupled to the strut.

17. The method of claim 14, wherein the one wheel is rotatably coupled to the base.

18. The method of claim 14, wherein a portion of the one wheel is disposed in an aperture of the base.

19. The method of claim 14, wherein a portion of the one wheel is disposed within the strut.

20. The method of claim 14, further comprising pushing the strut down to push the second end down and to raise the first end and the wheel.

\* \* \* \* \*